United States Patent [19] [11] 3,822,779
McAuley [45] July 9, 1974

[54] FLEXIBLE MATERIAL CONVEYING CHAIN OF INTERLOCKING IDENTICAL WIRE LINKS

[75] Inventor: James H. McAuley, Bremen, Ohio

[73] Assignee: McAuley Manufacturing Inc., Bremen, Ohio

[22] Filed: Jan. 26, 1973

[21] Appl. No.: 326,583

[52] U.S. Cl. ............................................... 198/168
[51] Int. Cl. ............................................. B65g 19/00
[58] Field of Search .............................. 198/168, 53

[56] References Cited
UNITED STATES PATENTS
741,851   10/1903   Swegle .................................. 198/168
2,556,182   6/1951   Hapman ................................ 198/168
3,215,256   11/1965   McAuley ............................... 198/168

Primary Examiner—Richard E. Aegerter
Attorney, Agent, or Firm—Mahoney, Miller & Stebens

[57] ABSTRACT

A chain consisting of interlocking links all of which are identical and each of which is formed from a single piece of wire. Each link includes a circle in a plane transverse of the center line of the chain to provide a flight for conveying granular or other material through a tube or trough in which the chain may be mounted.

9 Claims, 9 Drawing Figures

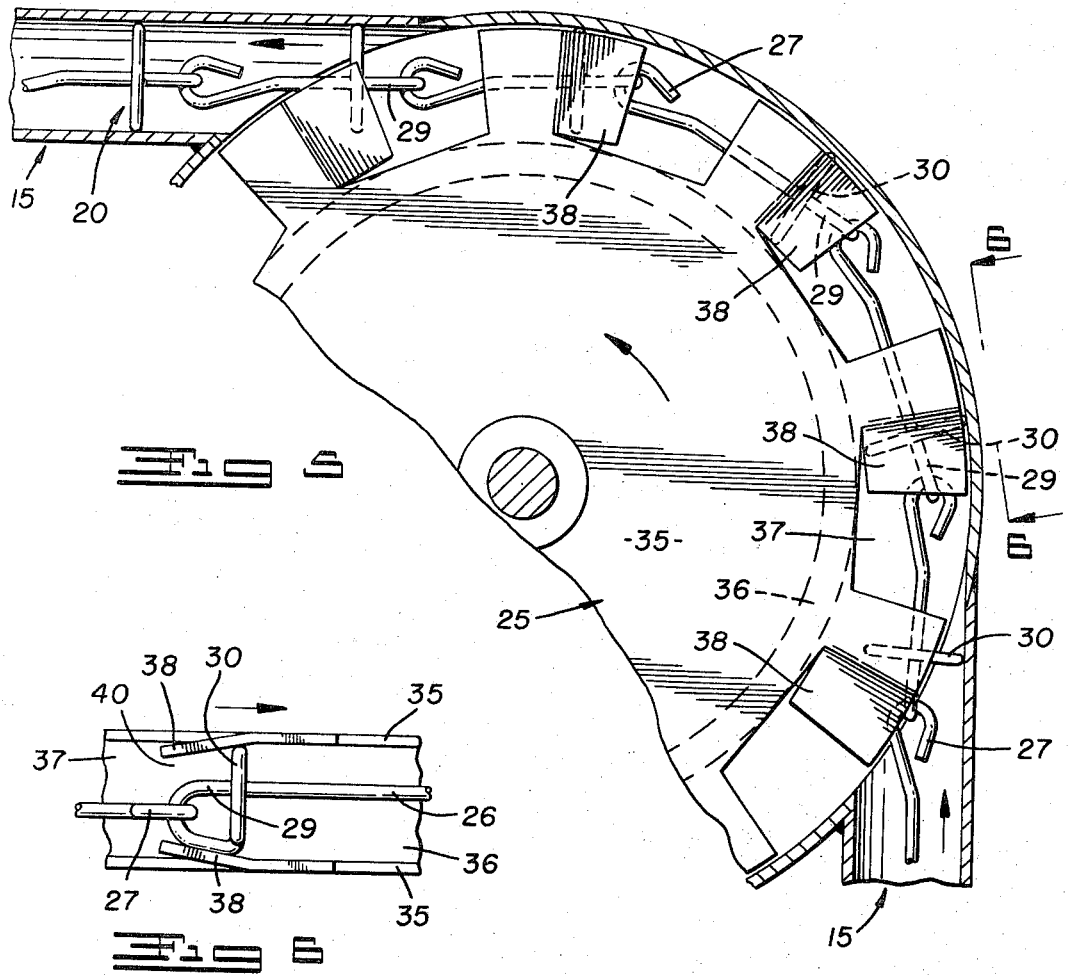
Fig. 5
Fig. 6
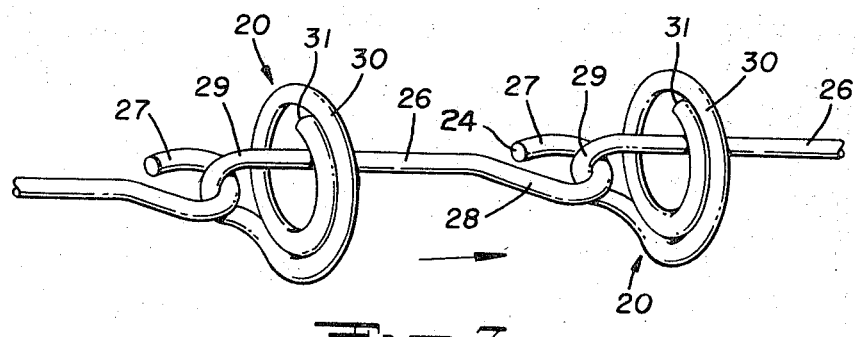
Fig. 7
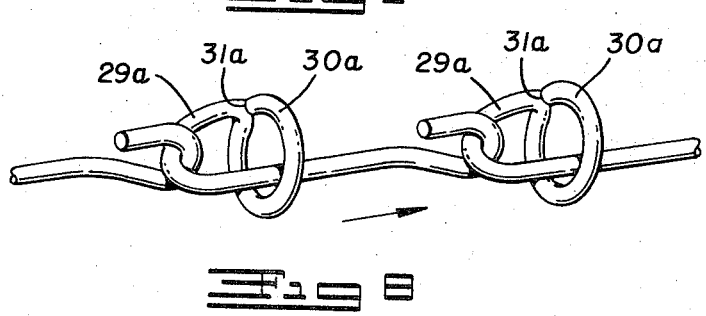
Fig. 8

FLEXIBLE MATERIAL CONVEYING CHAIN OF INTERLOCKING IDENTICAL WIRE LINKS

Chains made of wire have been used in the past for material-conveying applications such as in poultry feeders, cattle feeders, hog feeders, etc. These chains are of the usual lag-type but, in order to be capable of conveying material, must have flights in the form of separate plates welded or otherwise secured thereto in longitudinally spaced transverse planes. This requires additional operations which are time-consuming and expensive.

According to the presenctinvention there is provided a chain consisting of interlocking identical links made of wire. Each link of the chain has an integral flight provided for the purpose of engaging and conveying granular material, such as grain or feed, through tubes or along troughs. The flight is formed as an integral part of the link and is disposed in a plane transversely of the longitudinally extending body of the link. Special sprocket means is provided for driving the chain in a closed path so that it can be used as an ideal and inexpensive assembly for filling poultry feeders, cattle feeders, hog feeders, etc.

More specifically, each link is formed of wire with a longitudinally extending body having a hook at one end and a loop at the other. Intermediate the ends of the body, and preferably closer to one end, a circle or circles is formed around the body in a transverse plane to serve as a material-engaging and conveying flight. The circles or circles is formed as a continuation of the one piece of wire used in forming the body. The hooks and loops of adjacent links interlock to permit free flexing in all directions and are of such a nature as to allow for easy disconnecting and reconnecting at any joint in the chain.

The best modes contemplated in carrying out this invention are illustrated in the accompanying drawings in which:

FIG. 6 is an elevational view taken from the position indicated at line 6—6 of FIG. 5 and showing the engagement of the chain link and sprocket teeth.

FIG. 7 is a perspective view of interlocking links of the one form of chain.

FIG. 8 is a similar view of another form of chain.

FIG. 9 is a transverse sectional view similar to FIG. 4 but showing the form of chain of FIG. 8.

Figure 1:
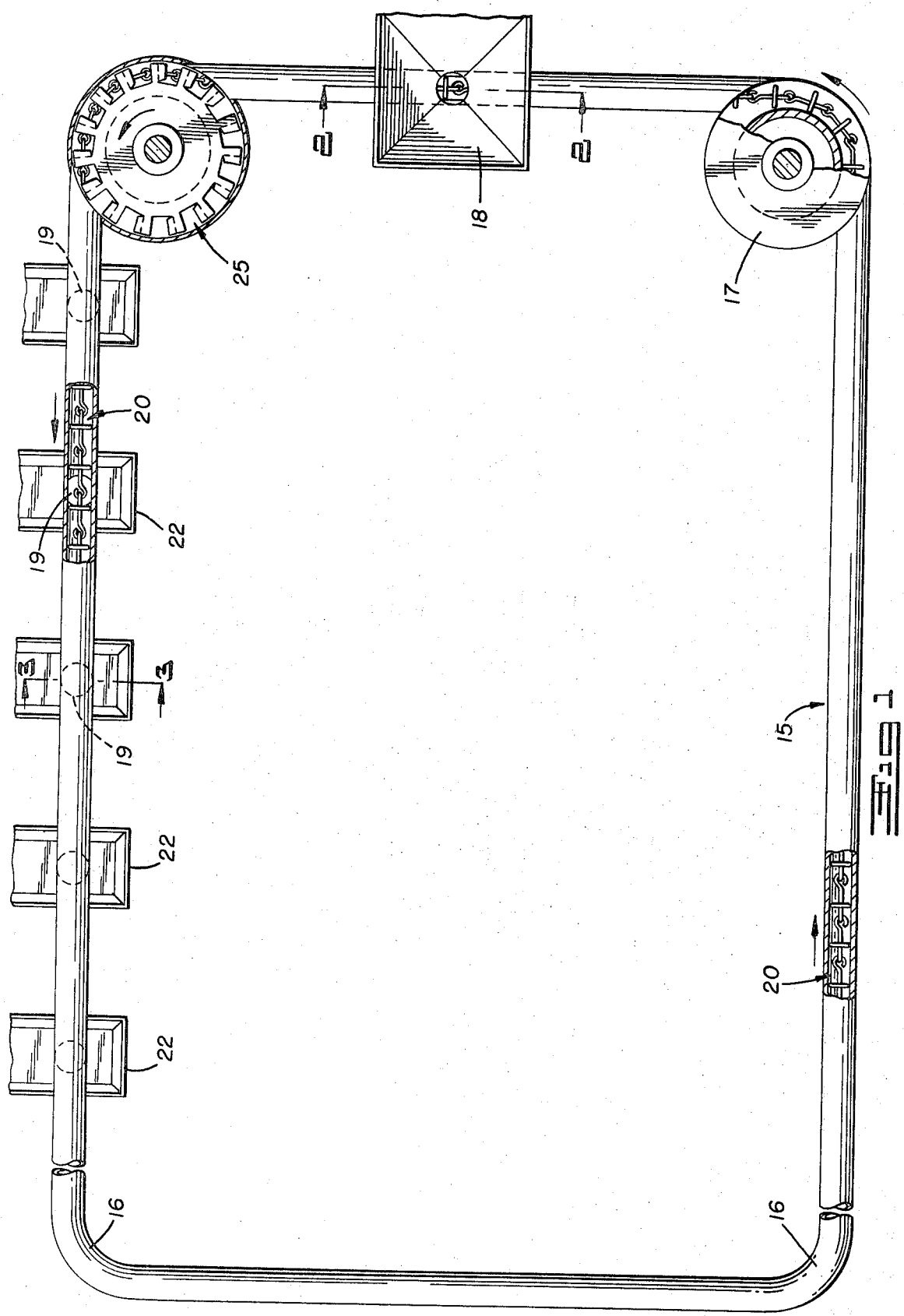
FIG. 1 is a schematic plan view, partly broken away illustrating an application of the chain of this invention.
Figure 2:
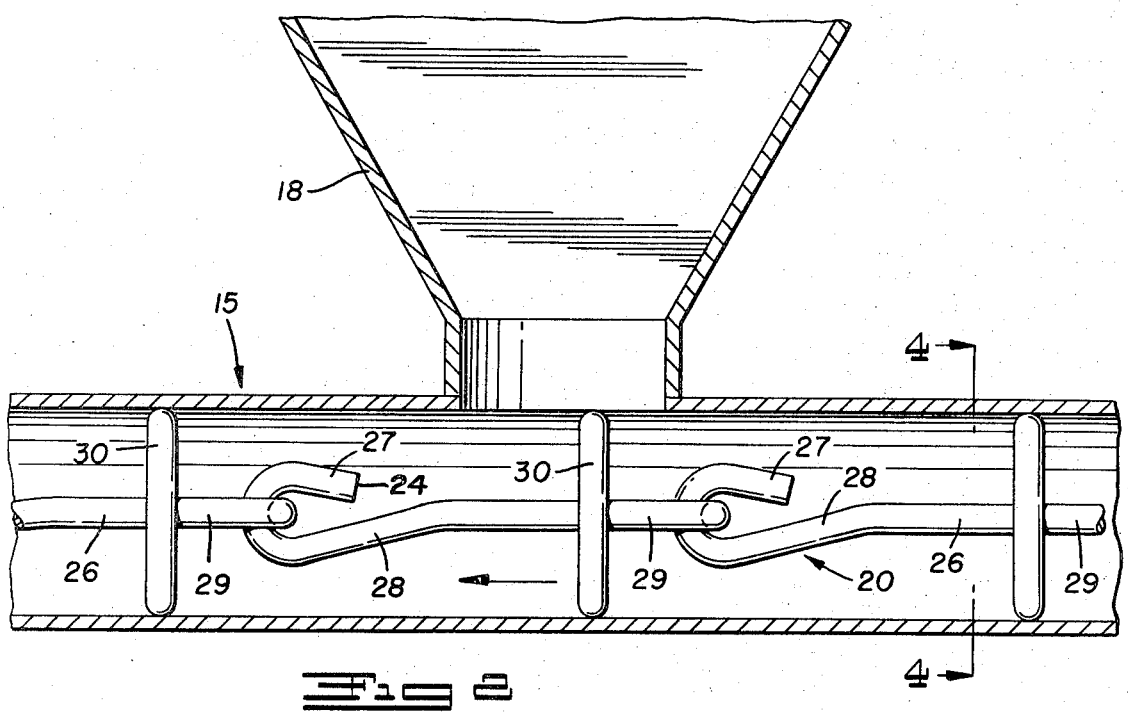
FIG. 2 is an enlarged longitudinal sectional view taken along line 2—2 of FIG. 1.

With specific reference to the drawings, in FIG. 1, there is illustrated an application of the chain and driving means of this invention to a poultry feeder. The feeder is shown as including a closed circuit of tubing 15 of circular cross-section in which the chain 20 is disposed and moves. The tubing is shown in a substantially rectangular pattern having curved sections 16 at some points where it changes directions which may be termed corners. At one or more of these corners an idler pulley 17 may be provided and at another corner a driving sprocket 25 may be provided on a driven shaft. The pulley 17 may be the usual grooved pulley but the sprocket 25 is of special form. A hopper 18 (FIG. 2) is disposed in a suitable position along the tubing to supply the feed. Bottom outlets 19 are provided at suitable locations along the tubing so that the feed will drop therethrough into connected vertical tubes 21 (FIG. 3) which will guide it into feeding trays 22. Although the chain 20 is shown as passing through horizontal tubing to convey fee therethrough, it will also function to lift material through vertically disposed tubing.

Each link of the chain formed from a single piece of wire bent to provide a longitudinally extending stem or body 26. At the forward or leading end of the link a hook 27 is formed, the stem being angled or offset at 28 so that the turn in the hook is centered relative to the axis of the stem. The one extremity of the wire 24 is at the hook and is angled inwardly toward the offset 28 so as to protect this end. At the other or trailing end of the link, a U-shaped loop 29 is formed in the same longitudinal plane as the stem and twisted at right angles to the plane of the link 27. Forwardly of the loop 29, the wire is turned to provide a transverse material-engaging flight 30. It will be noted that this flight is formed by two overlapping circular portions and that the end extremity 31 of the wire is within and covered by the outer circle which will protect it. This overlapping of circular portions will provide a larger area of material-engaging surface. The flight is formed by turning the one end of the piece of wire transversely into one or more circles or closed turns in a transverse plane preferably normal to the axis of the stem.

In FIGS. 8 and 9 the structure of the link is exactly the same as that just described except that the flight 30a is formed as a single circle and the end extremity 31a contacts and is protected by the joint where the circle starts from its junction with the loop 29a.

Figures 3, 4, 5:
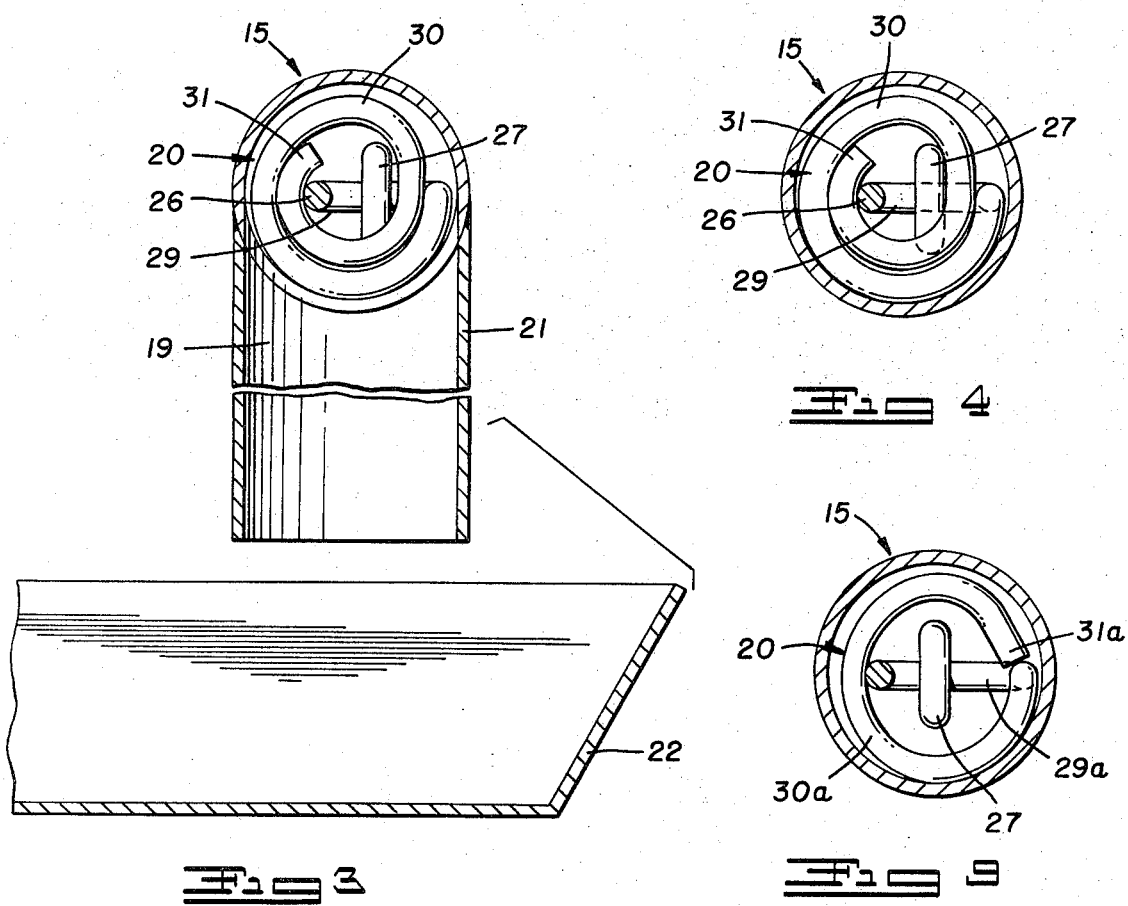
FIG. 3 is an enlarged transverse sectional view taken along line 3—3 of FIG. 1.
FIG. 4 is a transverse sectional view taken along line 4—4 of FIG. 2.
FIG. 5 is a horizontal sectional view illustrating the cooperation of a special driving sprocket and the chain.

Thus, the link can consist of a flight formed integrally in the link in a transverse plane relative to the stem or body of the link. The flight may consist of a single circular portion or more than one overlapping circular portions. The circles provide peripheral material-engaging surfaces and, as indicated in FIGS. 4 and 9, the circular flight of a particular link of the chain is followed immediately by the loop of that chain and the hook of the succeeding chain which provide a cross-shaped surface that aligns with and almost fills the void of the circle or circles. Even with the single circle form of FIGS. 8 and 9, it has been found in actual practice that the link has ample material-carrying capacity in vertical installations as well as horizontal installations.

The interlocking links provide the chain 20 but, as previously indicated, a sprocket 25 of special formation must be provided for driving it. This sprocket is indicated best in FIGS. 5 and 6. It comprises a pair of discs 35 which are spaced apart axially by an annular wall 36 to provide an annular radially outwardly-opening continuous channel 37 extending around the sprocket for receiving the chain 20. The sprocket engages the flights 30 or 30a of the respective chains to drive them and the engagement is by pairs of teeth 38 formed by bending inwardly, towards each other, slitted lug portions of the discs 35 at each side of the channel 37. Each pair of lugs 38 provides a pocket 40 with converging walls into the mouth of which the flight 30 or 30a of the respective link will enter and be engaged by the converging lugs 38 so as to push the hook forwardly. The chain can be disposed in tubing 15 which is slightly larger in diameter than the circular flights of the links as indicated best in FIGS. 4 and 9. When so mounted, the links will readily move the material through the tubing. The joints that connect the links, namely the interlocking loops and hooks, are so formed as to allow for flexing in all directions and ease in disconnecting and reconnecting at any joint.

The unique configuration of the chain hooks produces a chain of high strength with minimum material and a high capacity for conveying the material. Such configuration makes it possible to form the successive links on a machine from a continuous length of wire and to simultaneously successively interlock the links. This formation is possible even though the link includes the transverse flight since it is formed as a circular bend or loop at the one end of the wire. Also, the chain is of such a nature that it can be applied to a continuous circuit in a feeder and be driven around the circuit by a simple and positive means. As indicated, the circuit may include vertical as well as horizontal sections. Although each chain link is shown as being formed integrally from wire of circular cross-section, it can be formed from wire of various other cross-sections.

Having thus described the invention, what is claimed is:

1. A material-conveying chain formed of identical interlocking links, each of said links being formed of a single piece of wire bent to provide a single longitudinally and axially extending stem having an open hook at one end in the plane of the stem and a loop at the other end in the plane of the stem and a transverse flight intermediate the ends in the form of a closed turn around the stem in a plane transversely of the stem.

2. A material-conveying chain according to claim 1 in which the loop is formed in U-shape, adjacent the stem end and the flight is formed as a closed turn which is a continuation of the U-shaped loop.

3. A material-conveying chain according to claim 2 in which the closed turn is in the form of a single circle.

4. A material-conveying chain according to claim 2 in which the closed turn is in the form of overlapping circular portions in a common transverse plane.

5. A material-conveying chain according to claim 2 in which the U-shaped loop is in a plane twisted at a right angle relative to the plane of the hook, and the hook is offset in the plane of the stem so that the turn in the hook is offset relative to the axis of the stem.

6. A material-conveying chain according to claim 2 in which the transverse plane of the flight is normal to the axis of the stem.

7. A material-conveying chain according to claim 2 in which the closed turn is circular, and the tube of circular cross-section in which the chain is disposed for axial movement.

8. In combination with the chain of claim 2, a sprocket for engaging and driving the chain, said sprocket having successive angularly disposed pockets each of which has a wide mouth for receiving a flight of the respective link and converging side walls for engaging the flight.

9. A material-conveying chain according to claim 5 in which the offset of the hook is provided by an angle in the stem where it is joined into the hook, the angle extending outwardly from the stem in the plane of the stem, the extremity of the hook being angled inwardly toward the said angle in the stem so as to protect said extremity.

* * * * *